(12) United States Patent
Esselborn et al.

(10) Patent No.: US 6,423,785 B1
(45) Date of Patent: Jul. 23, 2002

(54) MALEIC ANHYDRIDE COPOLYMERS CONTAINING AMINE OXIDE GROUPS AND THEIR USE AS DISPERSANTS FOR PIGMENTS OF FILLERS

(75) Inventors: Eberhard Esselborn, Essen; Manfred Gaikowski, Naumburg; Wolfgang Josten, Königswinter; Ellen Reuter, Essen; Stefan Silber, Krefeld; Andreas Stüttgen, Duisburg, all of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/497,288

(22) Filed: Feb. 3, 2000

(30) Foreign Application Priority Data

Feb. 5, 1999 (DE) .......................... 199 04 603

(51) Int. Cl.$^7$ .................................................. C08F 8/30
(52) U.S. Cl. ..................... 525/327.6; 524/447
(58) Field of Search ..................... 524/447; 525/327.6

(56) References Cited

U.S. PATENT DOCUMENTS 6,045,857 A * 4/2000 Gupta .......................... 427/96
6,123,933 A * 9/2000 Hayama ...................... 424/69

FOREIGN PATENT DOCUMENTS

| DE | 3906702 C2 | 9/1990 |
| EP | 0 311 157 A1 | 4/1989 |
| EP | 0 595 129 B1 | 5/1994 |
| EP | 0 879 860 A2 | 11/1998 |
| WO | WO 96/14347 | 5/1996 |

* cited by examiner

Primary Examiner—Paul R. Michl
(74) Attorney, Agent, or Firm—Frommer Lawrence & Haug LLP

(57) ABSTRACT

The invention relates to maleic anhydride copolymers containing amine oxide groups and to their use as dispersants for pigments and fillers.

27 Claims, No Drawings

MALEIC ANHYDRIDE COPOLYMERS CONTAINING AMINE OXIDE GROUPS AND THEIR USE AS DISPERSANTS FOR PIGMENTS OF FILLERS

RELATED APPLICATIONS

This application claims priority to German application DE 199 04 603.4, filed Feb. 5, 1999, herein incorporated by reference.

BACKGROUND OF THE INVENTION

1. Field of the Invention

The present invention relates to maleic anhydride copolymers containing amine oxide groups and to their use as dispersants for pigments or fillers.

2. Description of the Related Art

In accordance with the prior art it is common to use, as dispersants, polyacrylic esters having acidic and/or basic groups, which may also be in salt form, which can be prepared by polymerizing corresponding monomeric acrylic esters, such as butyl acrylate, acrylic acid, 2-hydroxyethyl acrylate and its alkoxylation products, and other monomers having vinylic double bonds, such as styrene or vinylimidazole, for example (see for example EP-B-0 311 157). There are also descriptions, however, of how it is possible by transesterification reactions on alkyl polyacrylates, by replacing the alkyl group in the manner of a polymer-analogous reaction by alcohols or amines, to produce dispersants of this kind (see for example EP-B-0 595 129, DE-C-39 06 702, EP-A-0 879 860). Advantages of the polymer-analogous reaction regime are said to lie in the narrower molecular weight distribution and absence of disruptive or toxic monomer fractions. In this way it is also said to be possible to produce polymers which are not available by direct polymerization owing to the lack of industrial availability of corresponding polymerizable monomers. Such alcoholyses or aminolyses often require the use of, in general, strongly acidic catalysts such as, for example, sulfuric acid or para-toluenesulfonic acid, or metal salts such as, for example, titanates, which at the reported reaction temperatures of up to 200°°C. result not only in unwanted side reactions, which cause an increase in molecular weight, but also in often strongly colored products, whose coloring means that they are poorly suited or even totally unsuitable for demanding dispersion tasks.

In a very similar way, use is also made of polymers containing diesters of free-radically polymerizable dicarboxylic acids, such as dialkyl maleates, for example, as a basis for preparing dispersants, as set out, for example, in WO 96/14347. That document describes first of all a transesterification of the alkyl dicarboxylate with a hydroxy-functional polyoxyalkylene followed by a subsequent copolymerization with a further vinylically unsaturated monomer. A disadvantage here again is that the transesterification step, in the presence of preferably acidic catalysts, requires reaction temperatures of approximately 160°°C., which again entail the abovementioned disadvantages in respect of the possible use of the dispersants obtained in this way. The subsequent copolymerization is dependent on the addition of large amounts of costly organic peroxides as initiator in order to obtain sufficient conversions and reproducible copolymers. Despite this, and especially when using monomers having weight-average molecular weights of more than 500 g/mol, there still remain considerable fractions of unpolymerized monomer in the reaction mixture in unreacted form, which can also no longer be removed economically. In addition to the economic disadvantages, this is particularly undesirable owing to the potential toxic properties inherent in the majority of free-radically polymerizable vinyl compounds. Furthermore, the products have generally undergone further severe darkening after the copolymerization. This again places great restrictions on possible applications.

With the prior art dispersants described above it is, moreover, impossible to meet (fully) the diverse performance requirements made in particular in the sector of high-quality industrial coatings, such as, for example, the OEM finishing of automobiles. For instance, time and again, disadvantages which are in some cases mutually contradictory—for example, absence of compatibility with various binders, adequate activity only at very high levels of added dispersant, excessive dispersion times, levels of achievable pigmentation which are too low, insufficient development of color strength, constancy of viscosity and shade (especially after storage), or flocculation and aggregation (including that observed after a time delay) owing to excessively weak stabilization of the pigments by the dispersant—prevent their broad use.

OBJECT OF THE INVENTION

An object of the present invention is therefore to overcome a large number of the above disadvantages and to provide novel dispersants which are easy to prepare and which in particular feature extraordinarily good performance properties.

It has surprisingly been found that it is possible to obtain novel dispersant which are superior to the prior art and do not have the above mentioned disadvantages.

SUMMARY OF THE INVENTION

These are maleic anhydride copolymers containing amine oxide groups, which are obtainable by reacting at least about 1 mol % of the anhydride groups of maleic anhydride copolymers with diamines from the group consisting of a) $HR^1N-R^2-NR^3R^4$ where
$R^1$ is hydrogen or a monovalent hydrocarbon radical having 1 to 24 carbon atoms,
$R^2$ is a divalent alkylene radical having 2 to 24 carbon atoms, and
$R^3$ and $R^4$ are aliphatic and/or alicyclic alkyl radicals having 1 to 12, preferably 1 to 6, carbon atoms, which can be identical or different and subsequently carrying out oxidation with the formation of amine oxide groups which are attached by way of monoamide groups and/or imide groups and are of the following general formula (as the skilled worker is well aware, the wavy lines are intended to indicate that, hereinbelow, this representation relates merely to a section of a polymer compound)

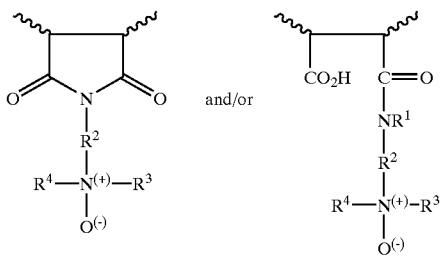 and/or

Preference is given to maleic anhydride copolymers containing amine oxide groups, in which a further portion of the anhydride groups has been reacted with alcohols and/or amines from the group consisting of b) saturated or unsaturated, alicyclic or cyclic monohydroxy and/or monoamine compounds of the general formula $$HO-R^1 \text{ or } HR^2N-R^1, \text{ respectively,}$$

where
$R^1$ is a hydrocarbon radical having 2 to 24 carbon atoms, and
$R^2$ is hydrogen or a monovalent hydrocarbon radical having 1 to 24 carbon atoms, with the formation of corresponding monoester, monoamide or imide structures, respectively.

Preference is likewise given to maleic anhydride copolymers containing amine oxide groups, in which a further portion of the anhydride groups has been reacted with c) polyoxyalkylene compounds of the general formula

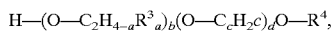

where
$R^3$ are identical or different alkyl radicals or alkylene radicals having 1 to 24 carbon atoms or are substituted or unsubstituted phenyl radicals having up to 24 carbon atoms, and
$R^4$ is hydrogen or a saturated or unsaturated, optionally branched or cyclic or aromatic hydrocarbon radical having up to 24 carbon atoms, which can, if desired, also include heteroatoms from the group consisting of O, S, N, P, Si, F, Cl, Br, and I,
a=0 to 3,
b=0 to 100,
c=2 to 12,
d=0 to 100,
and the sum (b+d)=2 to 200,
the sequence of the polyoxyalkylene segments $(O-C_2H_{4-a}R^3_a)_b$ and $(O-C_cH_{2c})_d$ being arbitrary with the formation of corresponding monoester structures.

Preference is likewise given to maleic anhydride copolymers containing amine oxide groups, in which a further portion of the anhydride groups has been reacted with d) polyoxyalkylene compounds of the general formula

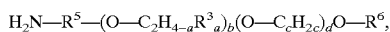

where
$R^3$ are identical or different alkyl radicals or alkylene radicals having 1 to 24 carbon atoms or are substituted or unsubstituted phenyl radicals having up to 24 carbon atoms,
$R^5$ is a divalent alkylene radical having 2 to 6 carbon atoms, and
$R^6$ is hydrogen or a saturated or unsaturated, optionally branched or cyclic or aromatic hydrocarbon radical having up to 24 carbon atoms, which can, if desired, also include heteroatoms from the group consisting of O, S, N, P, Si, F, Cl, Br, and I,
a=0 to 3,
b=0 to 100,
c=2 to 12,
d=0 to 100,
and the sum (b+d)=2 to 200,
the sequence of the polyoxyalkylene segments $(O-C_2H_{4-a}R^3_a)_b$ and $(O-C_cH_{2c})_d$ being arbitrary with the formation of corresponding monoamide and/or imide structures.

DESCRIPTION OF THE PREFERRED EMBODIMENTS

The index a here can adopt different values in one polyoxyalkylene. This is intended to express the fact that suitable polyoxyalkylenes can be either, for example, homopolymers of ethylene glycol, copolymers of ethylene glycol and 1,2-propylene glycol, or else a multiple copolymer of more than two monomers, such as for example ethylene glycol, 1,2-propylene glycol and 1,2-butylene glycol. Irrespective of this, the index c can also adopt different values in one polyoxyalkylene, so that, for example, multiple copolymers can be built up additionally with 1,4-butylene glycol and the copolymers can have a random or block structure.

As comonomer(s), the maleic anhydride copolymers of the invention containing amine oxide groups may include at least one further, different monomer having vinylic double bonds, preferably a monomer from the group consisting of styrene, alkylated styrene compounds, (meth)acrylic acid, (meth)acrylic esters, alkyl vinyl ethers, vinyl acetate, and itaconic esters or mixtures of monomers from this group.

Preference is given to the use of styrene as comonomer, the molar ratio of maleic anhydride to styrene being between about 1:1 and about 1:3.

The maleic anhydride copolymers of the invention containing amine oxide groups preferably have a molecular weight Mw of from about 1000 to about 100,000, preferably from 2500 to 50,000, g/mol.

Depending on desired properties, the carboxylic acid groups present in the polymer can be neutralized to carboxylate salts.

The invention additionally provides for the use of the maleic anhydride copolymers containing amine oxide groups as dispersants for pigments or fillers, especially for preparing pigment concentrates, the dispersant being homogenized together with the pigments and/or fillers to be dispersed, if desired in the presence of organic solvents and/or water, if desired with binders and, if desired, with conventional coatings auxiliaries.

The invention likewise provides for the use of the copolymers of the invention for preparing a coating composition, a binder being dispersed together, if desired, with a solvent, with pigments and/or fillers, with the dispersant and, if desired, with auxiliaries.

The invention therefore provides a new class of dispersing additives having unexpectedly prominent properties.

The formula scheme below is to be seen as an example for the purpose of illustrating the reaction sequence and the structures formed in the course thereof:

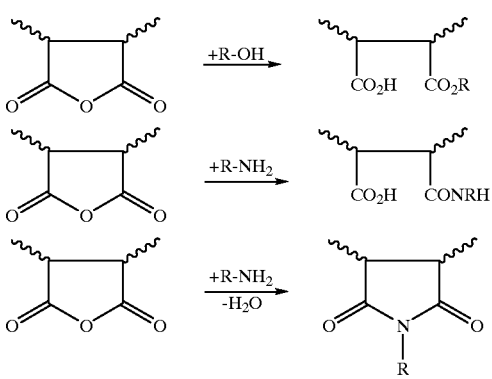

The skilled worker is well aware that, of course, through the use of compounds which contain more than just one functional group capable of nucleophilic substitution at anhydride groups, such as, for example, dihydroxy or trihydroxy compounds by means of intermolecular reaction at two or more anhydride groups, which therefore belong to different maleic anhydride copolymers, it is possible for there to be an increase in molecular weight as a result of a crosslinking reaction between at least two maleic anhydride copolymer chains. This fact can be utilized in a targeted manner, and, by way of the amount of polyfunctional compound added, the molecular weight of the overall molecule can be controlled within wide ranges in order to establish specific properties, such as the viscosity, for example.

The dispersing properties—long known to the skilled worker—of the maleic anhydride copolymers and their derivatives obtainable by alcoholyses or aminolyses, as are described, for example, inter alia, in JP 62 183 845, WO 97/15382 and EP-0 747 457, can be decisively improved by introducing amine oxide groups attached by way of monoamide and/or imide groups. Furthermore, this can be achieved with retention of the original diversity of structural variation possibilities of the maleic anhydride copolymers, which, as the skilled worker is well aware, are at least equal in their diversity to the abovementioned alcoholysis products and aminolysis products of alkyl acrylate polymers, by virtue of reaction with a very wide variety of nucleophils, but which offer distinct advantages in performance terms.

The fact that even a comparatively minor modification of the maleic anhydride copolymers, of from 1 mol % per anhydride group, with amine oxide groups of the above general formula which are attached by way of monoamide and/or imide groups, brings with it a marked improvement in the dispersing properties is surprising, since there is next to no knowledge of any dispersion-enhancing property of amine oxides for pigments and fillers. In this case it is found that amine oxides apparently have a particularly good capacity for interacting with a wide variety of pigment surfaces and so ensuring extremely reliable adsorption of the dispersant on the pigment surface. Amine oxides therefore act as particularly effective examples of what are known as "anchor groups", as was described quantitatively long ago for carboxylic acid groups, for example, (for comparison, see L. Dintenfass, JOCCA, 41 (1958) 125); an overview of further anchor groups, the various mechanisms, and further literature is given in J. D. Schofield, Polymeric Dispersants, in Handbook of Coatings Additives, Vol. 2, 15 Edition (L. J. I. Calbo, Ed.), Marcel Dekker, New York (1992) 71.

Amine oxides themselves, however, according to the prior art, are described only generally in the form of and/or in combination with betaine-type compounds ("inner salts") as dispersion promoters, such as in JP 63 095 277 (for aluminum in printing inks), U.S. Pat. No. 4,486,405 (for metal oxides in cosmetic formulations), DE-B-25 46 810 (for fillers in epoxy systems), and DE-B-16 44 193 (aftertreatment of azo dyes).

The maleic anhydride copolymers used as the basic raw material are available commercially (from Leuna-Harze GmbH, D-06236 Leuna) or can easily be obtained by methods common in the prior art, by free-radical polymerization of maleic anhydride with at least 100 mol % of a further, different monomer having vinylic double bonds, preferably a monomer from the group consisting of styrene, alkylated styrene compounds, (meth)acrylic acid, (meth) acrylic esters, alkyl vinyl ethers, vinyl acetate and itaconic esters, or mixtures of monomers from this group. Styrene as comonomer is particularly suitable when the molar ratio of maleic anhydride to styrene is between 1:1 and 1:3. Intense research into such polymers has been carried out since the nineteen forties and continuously thereafter, as shown for example by S. D. Baruah, N. C. Laskar, J. Appl. Polym. Sci. (1996), 60, 649 and U.S. Pat. No. 4,180,637.

The reaction of the anhydride groups with the specified amino and/or hydroxy compounds can be carried out either with the addition of solvents and catalysts or without additional solvents and catalysts. In any individual case, however, the use of basic catalysts such as tertiary amines of low nucleophilicity is advantageous. As a function of the chosen temperature and, with particular advantage, utilizing a temperature gradient, it is possible to establish the preferential formation of monoamides and imides, with the monoamides (addition reaction) forming at room temperature whereas the synthesis of the imides (condensation reaction) necessitates temperatures preferably of 80°°C. and above depending on the reaction component, solvent and experimental setup:

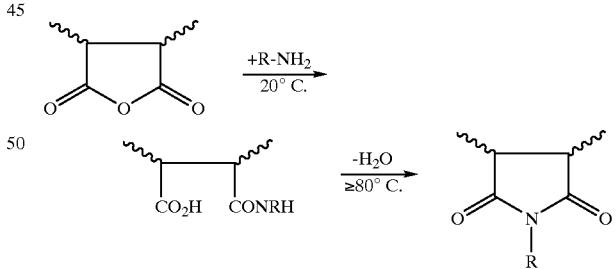

The amine oxides of the invention can be prepared in accordance with methods known from the literature by means of simple oxidation with aqueous hydrogen peroxide solution at moderate temperatures. This reaction has no adverse effect on the other structural elements and functional groups that are present in the molecule in accordance with the invention. The reaction is exemplified below using a maleimide derivative of the invention:

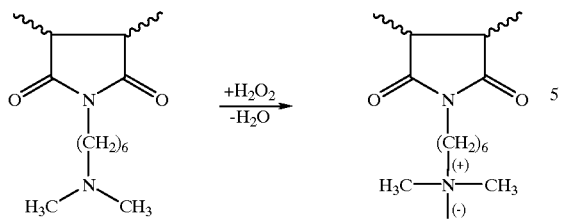

The skilled worker is well aware that, depending on the reaction conditions, and in the presence of water, it is likewise possible for there to be—at least partial—formation of the analogous amine oxide hydrates of the amine oxides of the invention. Their possible presence in the dispersants of the invention therefore requires no further specific mention and is, accordingly, sufficiently clarified and described with the use of the term "amine oxide".

EXAMPLES

General Preparation Procedure

A maleic anhydride copolymer (copolymer of maleic anhydride and styrene; from Leuna Harze GmbH) having an acid number of 335 mg KOH/g and a molecular weight average of $M_w$=10,000 to 20,000 g/mol was dissolved in a methyl ethyl ketone/methyl isobutyl ketone mixture (mixing ratio 20:80% by weight) and this solution was mixed with a mixture of a monohydroxy-functional polyoxyalkylene (copolymer of ethylene oxide and propylene oxide containing 25% by weight propylene oxide, hydroxyl number 34 mg KOH/g, viscosity 300 mPas/25° C.), an amino-functional polyoxyalkylene (Jeffamin M 2070; from Texaco Chemical Company) and with N,N-dimethylaminopropylamine in the desired molar ratio, based on the anhydride groups of the maleic anhydride copolymer. This mixture was heated under pressure for 4 hours. The reaction was terminated when the resulting product has the desired acid number. The solvent was removed by distillation. The product was a pale yellow, clear liquid of moderate viscosity.

40 g of the pale yellow reaction product of moderate viscosity that was obtained in this way are diluted with 60 g of water, 0.1% by weight of ethylenediamine-tetraacetate (EDTA) was added, and the mixture was heated to 70° C. Following the addition of 1.5 g of 30% strength aqueous hydrogen peroxide solution it was stirred for 8 hours. Thereafter it is heated to 100° C. and excess peroxide was boiled away in 4 hours.

The end product was likewise pale yellow and clear and was of low viscosity.

The 8 Preparation Examples below were prepared in accordance with this procedure. Of these, Preparation Examples 1 to 5 were synthesized in accordance with the invention by the specified procedure, with the formation of amine oxide groups attached by way of monoamide and/or imide groups. In the case of Preparation Examples 6 to 8 (not in accordance with the invention), on the other hand, there was no formation of amine oxide groups attached by way of monoamide and/or imide groups.

| Preparation Example | Monohydroxy-functional polyoxyalkylene [mol %] | Jeffamin M 2070 [mol %] | N,N-Dimethyl-aminopropylamine [mol %] | Reaction temperature [° C.] | Acid number at end of reaction [mg KOH/g] |
|---|---|---|---|---|---|
| 1 | 20 | 10 | 10 | 150 | 65 |
| 2 | 40 | 0 | 15 | 150 | 47 |
| 3 | 10 | 20 | 20 | 150 | 48 |
| 4 | 20 | 20 | 10 | 150 | 44 |
| 5 | 25 | 25 | 5 | 150 | 36 |
| 6 | 50 | 0 | 0 | 135 | 63 |
| 7 | 0 | 50 | 0 | 150 | 32 |
| 8 | 25 | 25 | 0 | 150 | 39 |

USE EXAMPLES

Aqueous pigment pastes were prepared using from 0.1 to 100% by weight of the maleic anhydride copolymers of the invention, preferably from 0.5 to 50% by weight (based on the weight of the pigments). The copolymers of the invention were either mixed beforehand with the pigments to be dispersed or dissolved directly in the dispersion medium (water with possible additions of glycol ether) prior to or simultaneously with the addition of the pigments and any other solids.

Aqueous, highly concentrated, pumpable and flowable pigment preparations were prepared in a simple manner by mixing the polymer to be used, alone or in combination with at least one further component, with water, scattering the pigment into this mixture, with stirring, and dispersing the mixture until a suspension of the desired fineness and consistency is obtained.

A further method of preparing the pigment preparations was first to carry out dry mixing of a pigment with the copolymers of the invention to give a pulverulent pigment formulation. This formulation can be dispersed in water as and when required to give the pigment preparation of the invention.

A third method of preparing aqueous, highly concentrated, pumpable and flowable pigment suspensions and pigment pastes was to add the copolymer of the invention to a water-moist pigment filter cake and to incorporate it into the pigment filter cake, using for example a dissolver, in the course of which the filter cake becomes liquid.

Examples of pigments that may be dispersed are:
Monoazo pigments:
   C.I. Pigment Brown 25;
   C.I. Pigment Orange 5,36 and 67;
   C.I. Pigment Red 1, 2, 3, 48:4, 49, 52:2, 53, 57:1, 251, 112, 170 and 184;
   C.I. Pigment Yellow 1, 3, 73, 74, 65, 97, 151 and 183;
Diazo pigments:
   C.I. Pigment Orange 34;
   C.I. Pigment Red 144 and 166
   C.I. Pigment Yellow 12, 13, 17, 83, 113 and 126;
Anthraquinone pigments:
   C.I. Pigment Yellow 147 and 177;
   C.I. Pigment Violet 31;
Anthrapyrimidine pigments:
   C.I. Pigment Yellow 108;
Quinacridone pigments:
   C.I. Pigment Red 122,202 and 20;
   C.I. Pigment Violet 19;

Quinophthalone pigments:
  C.I. Pigment Yellow 138;
Dioxazine pigments:
  C.I. Pigment Violet 23 and 27;
Flavanthrone pigments:
  C.I. Pigment Yellow 24;
Indanthrone pigments:
  C.I. Pigment Blue 60 and 64;
Isoindoline pigments:
  C.I. Pigment Orange 69;
  C.I Pigment Red 260;
  C.I. Pigment Yellow 139;
Isoindolinone pigments:
  C.I. Pigment Orange 61;
  C.I Pigment Red 257 and 260
  C.I. Pigment Yellow 109, 110, 173 and 185;
Metal complex pigments:
  C.I. Pigment Yellow 117 and 153;
Perinone pigments:
  C.I. Pigment Orange 43;
  C.I. Pigment Red 194;
Perylene pigments:
  C.I. Pigment Black 31 and 32;
  C.I. Pigment Red 123, 149, 178, 179, 190 and 224;
  C.I. Pigment Violet 29;
Phthalocyanine pigments:
  C.I. Pigment Blue 15, 15:1, 15:2, 15:3, 15:4, 15:6 and 16;
  C.I. Pigment Green 7 and 36;
Pyranthrone pigments:
  C.I. Pigment Orange 51;
  C.I. Pigment Red 216;
Thioindigo-pigments:
  C.I. Pigment Red 88;
Triphenylmemane pigments:
  C.I. Pigment Blue 1, 61, and 62;
  C.I. Pigment Green 1;
  C.I. Pigment Red 81 and 169;
  C.I. Pigment Violet 2 and 3;
C.I. Pigment Black 1 (Aniline black)
C.I. Pigment Yellow 101 (Aldazine yellow)

Inorganic Pigments

White pigments:
  Titanium dioxide (C.I. Pigment White 6), zinc white, pigment-grade zinc oxide; zinc sulfide, lithopones; lead white;
Black pigments:
  Iron oxide black (C.I. Pigment Black 11), iron manganese black, spinel black (C.I. Pigment Black 27); carbon black (C.I. Pigment Black 7);
Colored pigments:
  Chromium oxide, chromium oxide hydrate green; chromium green (C.I. Pigment Green 48); cobalt green (C.I. Pigment Green 50); ultramarine green;
  Cobalt blue (C.I. Pigment Blue 28 and 36); ultramarine blue; iron blue (C.I Pigment Blue 27); manganese blue;
  Ultramarine violet; cobalt and manganese violet;
  Iron oxide red (C.I. Pigment Red 101); cadmium sulfoselenide (C.I. Pigment Red 108); molybdate red (C.I. Pigment Red 104); ultramarine red;
  Iron oxide brown, mixed brown, spinel phases and corundum phases (C.I. Pigment Brown 24, 29 and 31);
  Chromium orange;
  Iron oxide yellow (C.I. Pigment Yellow 42); nickel titanium yellow (C.I. Pigment Yellow 53; C.I. Pigment Yellow 157 and 164); chromium titanium yellow, cadmium sulfide and cadmium zinc sulfide (C.I. Pigment Yellow 37 and 35); chromium yellow (C.I. Pigment Yellow 34), zinc yellow, alkaline earth metal chromates, Naples yellow, bismuth vanadate (C.I. Pigment Yellow 184);
Luster pigments:
  Metallic pigments based on metal oxide-coated metal flakes; pearl luster pigments based on metal oxide-coated mica platelets.

Examples of fillers which can be dispersed, for example, in aqueous coating materials are those based on kaolin, talc, other silicates, chalk, glass fibers, glass beads, and metal powders.

Suitable coating systems into which the pigment preparations of the invention can be incorporated are any desired aqueous one- or two-component coating materials. Examples that may be mentioned are aqueous one-component coating materials such as, for example, those based on alkyd, acrylate, epoxy, polyvinyl acetate, polyester or polyurethane resins, or aqueous two-component coating materials, examples being those based on hydroxyl-containing polyacrylate or polyester resins with melamine resins or optionally blocked polyisocyanate resins as crosslinkers. Similarly, mention may also be made of polyepoxy resin systems.

Water is the preferred solvent for the copolymers of the invention. However, organic solvents, such as glycol ethers or glycol esters, for example, can also be used, alone or in a mixture with water. The addition of solvents is advantageous in many cases especially for the initial drying behavior of the pigment pastes prepared using the copolymers of the invention.

To prepare the pigment pastes of the invention it is also possible, moreover, to add further water-dispersible polymers not in accordance with the invention, such as, for example, polyacrylate, polyurethane or polysiloxane derivatives.

For preparing the pigment concentrations of the invention it is additionally possible to use further auxiliaries, such as defoamers, preservatives, wetting agents, devolatizers, or prior art antisettling agents, waxes, and theological additives.

Preparation of the Pigment Pastes

To prepare the pigment pastes, the dispersing additives in accordance with the invention (1 to 5) and not in accordance with the invention (6 to 8), which had been dissolved beforehand in water to give 40% strength solutions, were mixed with water and auxiliaries, and then the pigments were added. Dispersion took place following the addition of grinding media (glass beads 2 to 3 mm, same volume as the pigment paste) for 1 h (titanium dioxide) or 2 h (other pigments) in a Skandex shaker with air cooling.

Formulation of the White Pastes

The white pastes were formulated as follows (amounts in % by weight):

16.4 water
12.3 additive solution, 40% strength 1.0 defoamer (e.g., Tego Foamex LA-E 455, Tego Chemie Service GmbH)

70.0 titanium dioxide 2160 (Kronos)

0.3 Aerosil A 200 (Degussa)

Formulation of the Black Pastes

The black pastes were formulated as follows (amounts in % by weight): 60.3 water 22.3 additive solution, 40% strength 1.0 defoamer (e.g., Tego Foamex LE-E 455, Tego Chemie Service GmbH)

1.4 AMP 90 (Angus)

15.0 pigment-grade carbon black FW 200 (Degsssa)

Formulation of the Red Pastes

The red pastes were formulated as follows (amounts in % by weight):

57.0 water 18.0 additive solution, 40% strength 1.0 defoamer (e.g., Tego Foamex LE-E 455, Tego Chemie Service GmbH)

24.0 Paliogenrot 3885 (BASF)

Formulation of the Blue Pastes

The blue pastes were formulated as follows (amounts in % by weight):

29.0 water 35.0 additive solution, 40% strength 1.0 defoamer (e.g., Tego Foamex LE-E 455, Tego Chemie Service GmbH)

35.0 Heliogenblau 7101 (BASF)

Test Coating Materials

Dispersion Clearcoat A 97.0 Neocryl XK 90 (Zeneca)

3.0 Texanol (Eastman)

Dispersion Clearcoat B 100.0 Daotan VTW 1225 (Clariant)

To prepare paints with mixed pigmentation, in each case 40.0 g of clearcoat were introduced initially, white paste and color paste are added in a ratio of 25:1 (solids to solids), and the mixture is homogenized manually using a brush for 3 minutes. The samples are knife-coated onto contrast cards in a wet film thickness of 100 μm and were dried at room temperature (dispersion coating).

Test of the Paste Stabilities

In order to determine the paste stabilities, the achievable initial viscosities and the viscosities after four weeks of storage at 50° C. are determined at two different shear rates (20 1/s and 1000 1/s).

White Pastes

| Sample | Viscosity/Pas immediate at 20 1/s | Viscosity/Pas immediate at 1000 1/s | Viscosity/Pas after 4 wks at 50° C. at 20 1/s | Viscosity/Pas after 4 wks at 50° C. at 1000 1/s |
|---|---|---|---|---|
| 1 | 0.64 | 0.18 | 0.82 | 0.30 |
| 2 | 0.58 | 0.17 | 0.73 | 0.29 |
| 3 | 0.53 | 0.15 | 0.72 | 0.30 |
| 4 | 0.61 | 0.19 | 0.69 | 0.27 |
| 5 | 0.65 | 0.15 | 0.77 | 0.34 |
| 6 | 0.79 | 0.12 | 1.46 | 0.58 |
| 7 | 0.72 | 0.15 | 1.23 | 0.53 |
| 8 | 0.75 | 0.18 | 1.62 | 0.48 |

Black Pastes

| Sample | Viscosity/dPas immediate at 20 1/s | Viscosity/dPas immediate at 1000 1/s | Viscosity/dPas after 4 wks at 50° C. at 20 1/s | Viscosity/dPas after 4 wks at 50° C. at 1000 1/s |
|---|---|---|---|---|
| 1 | 0.58 | 0.33 | 0.79 | 0.40 |
| 2 | 0.62 | 0.34 | 0.77 | 0.50 |
| 3 | 0.65 | 0.29 | 0.72 | 0.48 |
| 4 | 0.55 | 0.31 | 0.79 | 0.49 |
| 5 | 0.59 | 0.29 | 0.78 | 0.50 |
| 6 | 0.72 | 0.29 | 1.24 | 0.53 |
| 7 | 0.77 | 0.31 | 1.30 | 0.56 |
| 8 | 0.81 | 0.33 | 1.33 | 0.60 |

Red Pastes

| Sample | Viscosity/dPas immediate at 20 1/s | Viscosity/dPas immediate at 1000 1/s | Viscosity/dPas after 4 wks at 50° C. at 20 1/s | Viscosity/dPas after 4 wks at 50° C. at 1000 1/s |
|---|---|---|---|---|
| 1 | 0.62 | 0.40 | 0.75 | 0.73 |
| 2 | 0.58 | 0.37 | 0.80 | 0.59 |
| 3 | 0.64 | 0.48 | 0.79 | 0.61 |
| 4 | 0.66 | 0.49 | 0.90 | 0.70 |
| 5 | 0.56 | 0.42 | 0.70 | 0.60 |
| 6 | 0.84 | 0.39 | 1.54 | 0.86 |
| 7 | 0.91 | 0.54 | 1.58 | 0.79 |
| 8 | 0.88 | 0.49 | 1.62 | 0.84 |

Blue Pastes

| Sample | Viscosity/dPas immediate at 20 1/s | Viscosity/dPas immediate at 1000 1/s | Viscosity/dPas after 4 wks at 50° C. at 20 1/s | Viscosity/dPas after 4 wks at 50° C. at 1000 1/s |
|---|---|---|---|---|
| 1 | 0.54 | 0.36 | 0.70 | 0.49 |
| 2 | 0.56 | 0.29 | 0.59 | 0.41 |
| 3 | 0.49 | 0.31 | 0.65 | 0.45 |
| 4 | 0.59 | 0.41 | 0.74 | 0.55 |
| 5 | 0.50 | 0.33 | 0.57 | 0.44 |
| 6 | 0.84 | 0.29 | 1.39 | 0.86 |
| 7 | 0.83 | 0.31 | 1.42 | 0.91 |
| 8 | 0.91 | 0.39 | 1.36 | 0.90 |

The excellent stability of the pigment pastes of the invention is readily evident from the small increase in viscosity in each case.

Test of the Dispersing Properties

The test formulations were drawn down in a wet film thickness of 100 μm; after drying for six minutes, a rubout test is performed on ⅓ of the coated area Drying overnight was followed after 24 hours in each case by colormetric measurement of the drawdowns by means of an XP 68 spectrophotometer from X-Rite. Gloss and haze were determined using the haze-gloss instrument from Byk-Gardner

Dispersion Coating Based on Neocryl XK 90 (gray)

| Sample | Luminance L | Delta E after rubout | Gloss (60° angle) | Haze |
|---|---|---|---|---|
| 1 | 44.62 | 0.31 | 74.5 | 135 |
| 2 | 45.87 | 0.89 | 75.9 | 120 |
| 3 | 42.61 | 0.54 | 75.7 | 128 |
| 4 | 45.44 | 0.68 | 72.7 | 118 |
| 5 | 45.86 | 0.72 | 73.7 | 132 |
| 6 | 49.42 | 2.13 | 70.1 | 196 |
| 7 | 50.41 | 1.67 | 68.1 | 172 |
| 8 | 54.66 | 1.39 | 69.9 | 268 |

Dispersion Coating Based on Neocryl XK 90 (blue)

| Sample | −b | Delta E after rubout | Gloss (60° angle) | Haze |
|---|---|---|---|---|
| 1 | 33.66 | 0.49 | 73.1 | 131 |
| 2 | 33.92 | 0.93 | 77.2 | 145 |
| 3 | 33.31 | 0.79 | 75.6 | 141 |
| 4 | 31.58 | 0.90 | 76.7 | 149 |
| 5 | 32.70 | 0.83 | 74.5 | 151 |
| 6 | 34.33 | 1.45 | 70.7 | 168 |
| 7 | 34.01 | 1.39 | 40.0 | 201 |
| 8 | 34.75 | 1.79 | 71.0 | 170 |

Dispersion Coating Based on Daotan VTW 1225 (gray)

| Sample | Luminance L | Delta E after rubout | Gloss (60° angle) | Haze |
|---|---|---|---|---|
| 1 | 39.62 | 1.79 | 74.2 | 201 |
| 2 | 44.81 | 1.89 | 77.5 | 274 |
| 3 | 37.33 | 1.97 | 74.7 | 196 |
| 4 | 40.50 | 1.76 | 75.9 | 244 |
| 5 | 43.44 | 1.60 | 73.4 | 238 |
| 6 | 48.75 | 6.08 | 65.3 | 368 |
| 7 | 49.30 | 3.29 | 59.9 | 318 |
| 8 | 46.12 | 5.65 | 61.2 | 322 |

Dispersion Coating Based on Daotan VTW 1225 (blue)

| Sample | −b | Delta E after rubout | Gloss (60° angle) | Haze |
|---|---|---|---|---|
| 1 | 35.67 | 2.72 | 78.8 | 157 |
| 2 | 36.76 | 2.37 | 78.4 | 144 |
| 3 | 37.27 | 3.14 | 80.2 | 165 |
| 4 | 35.89 | 1.95 | 81.1 | 182 |
| 5 | 35.79 | 2.89 | 79.3 | 153 |
| 6 | 41.79 | 7.92 | 48.3 | 232 |
| 7 | 42.04 | 6.18 | 72.7 | 215 |
| 8 | 40.32 | 6.54 | 58.7 | 207 |

The more favorable development in color strength that can be obtained by using the dispersing additives, the rubout test, which gives favorable results in every case, owing to the additional polymer anchoring of the amine oxide groups in the pigment surface is evident As is evident from the above comparisons, the compounds of the invention are notable for their universal applicability, the ease of preparation of stable pigment pastes, the levels of pigmentation that can be achieved, the attainable shade stabilities, and their very universal utility.

The above description of the invention is intended to be illustrative and not limiting. Various changes or modification in the embodiment described herein may occur to those skilled in the art. Those changes can be made without departing from the spirit or scope of the invention.

What is claimed is:

1. A maleic anhydride copolymer containing amine oxide groups, which is obtainable by reacting at least about 1 mol % of the anhydride groups of maleic anhydride copolymers with diamines from the group consisting of a) $HR^1N-R^2-NR^3R^4$ where $R^1$ is hydrogen or a monovalent hydrocarbon radical having 1 to 24 carbon atoms, $R^2$ is a divalent alkylene radical having 2 to 24 carbon atoms, and $R^3$ and $R^4$ are identical or different aliphatic and/or alicyclic alkyl radicals having 1 to 12 carbon atoms, and subsequently carrying out oxidation with the formation of amine oxide groups, which are attached by way of monoamide groups and/or imide, groups and are of the following general formula

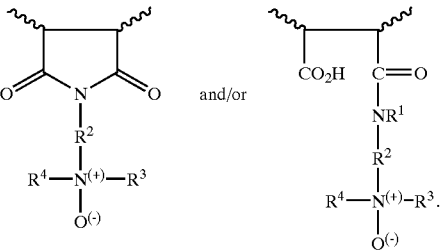

2. A maleic anhydride copolymer containing amine oxide groups as claimed in claim 1, which is obtainable by reacting a further portion of the anhydride groups with alcohols and/or amines from the group consisting of b) saturated or unsaturated, alicyclic or cyclic monohydroxy and/or monoamine compounds of the general formula $HO-R^1$ or $HR^2N-R^1$, respectively, where
R¹ is a hydrocarbon radical having 2 to 24 carbon atoms, and
R² is hydrogen or a monovalent hydrocarbon radical having 1 to 24 carbon atoms, with the formation of corresponding monoester, monoamide or imide structures, respectively.

3. A maleic anhydride copolymer containing amine oxide groups as claimed in claim 1 or 2, which is obtainable by reacting a further portion of the anhydride groups with
c) polyoxyalkylene compounds of the general formula

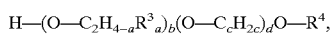

where
R³ are identical or different alkyl radicals or alkylene radicals having 1 to 24 carbon atoms or are substituted or unsubstituted phenyl radicals having up to 24 carbon atoms, and
R⁴ is hydrogen or a saturated or unsaturated, optionally branched or cyclic or aromatic hydrocarbon radical having up to 24 carbon atoms, which optimally contains heteroatoms selected from the group consisting of O, S, N, P, Si, F, Cl, Br, and I,
a=0 to 3,
b=0 to 100,
c=2 to 12,
d=0 to 100,
and the sum (b+d)=2 to 200,
the sequence of the polyoxyalkylene segments $(O-C_2H_{4-a}R^3_a)_b$ and $(O-C_cH_{2c})_d$ being arbitrary with the formation of corresponding monoester structures.

4. A maleic anhydride copolymer containing amine oxide groups as claimed claim 1 or 2, which is obtainable by reacting a further portion of the anhydride groups with
d) polyoxyalkylene compounds of the general formula

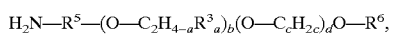

where
R³ are identical or different alkyl radicals or alkylene radicals having 1 to 24 carbon atoms or are substituted or unsubstituted phenyl radicals having up to 24 carbon atoms,
R⁵ is a divalent alkylene radical having 2 to 6 carbon atoms, and
R⁶ is hydrogen or a saturated or unsaturated, optionally branched or cyclic or aromatic hydrocarbon radical having up to 24 carbon atoms, which optimally contains heteroatoms selected from the group consisting of O, S, N, P, Si, F, Cl, Br, and I,
a=0 to 3,
b=0 to 100,
c=2 to 12,
d=0 to 100,
and the sum (b+d)=2 to 200,
the sequence of the polyoxyalkylene segments $(O-C_2H_{4-a}R^3_a)_b$ and $(O-C_cH_{2c})_d$ being arbitrary with the formation of corresponding monoamide and/or imide structures.

5. A maleic anhydride copolymer containing amine oxide groups as claimed claim 3, which is obtainable by reacting a further portion of the anhydride groups with
d) polyoxyalkylene compounds of the general formula

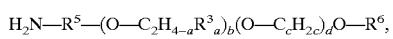

where
R³ are identical or different alkyl radicals or alkylene radicals having 1 to 24 carbon atoms or are substituted or unsubstituted phenyl radicals having up to 24 carbon atoms,
R⁵ is a divalent alkylene radical having 2 to 6 carbon atoms, and
R⁶ is hydrogen or a saturated or unsaturated, optionally branched or cyclic or aromatic hydrocarbon radical having up to 24 carbon atoms, which optionally contains heteroatoms selected from the group consisting of O, S, N, P, Si, F, Cl, Br, and I,
a=0 to 3,
b=0 to 100,
c=2 to 12,
d=0 to 100,
and the sum (b+d)=2 to 200,
the sequence of the polyoxyalkylene segments $(O-C_2H_{4-a}R^3_a)_b$ and $(O-C_cH_{2c})_d$ being arbitrary with the formation of corresponding monoamide and/or imide structures.

6. A maleic anhydride copolymer containing amine oxide groups as claimed in claim 1, wherein R³ and R⁴ are identical or different aliphatic and/or alicyclic alkyl radicals having 1 to 6 carbon atoms.

7. A maleic anhydride copolymer containing amine oxide groups as claimed claim 1, wherein the polymer comprises as comonomer at least one further, different monomer having vinylic double bonds.

8. A maleic anhydride copolymer containing amine oxide groups according to claim 7 wherein the monomer is selected from the group consisting of styrene, alkylated styrene compounds, (meth)acrylic acid, (meth)acrylic esters, alkyl vinyl ethers, vinyl acetate, itaconic esters and mixtures of the foregoing monomers.

9. A maleic anhydride copolymer containing amine oxide groups as claimed claim 2, wherein the polymer comprises as comonomer at least one further, different monomer having vinylic double bonds.

10. A maleic anhydride copolymer containing amine oxide groups as claimed in claim 3, wherein the polymer comprises as comonomer at least one further, different monomer having vinylic double bonds.

11. A maleic anhydride copolymer containing amine oxide groups as claimed in claim 4, wherein the polymer comprises as comonomer at least one further, different monomer having vinylic double bonds.

12. A maleic anhydride copolymer containing amine oxide groups according to claim 9 wherein the monomer is selected from the group consisting of styrene, alkylated styrene compounds, (meth)acrylic acid, (meth)acrylic esters, alkyl vinyl ethers, vinyl acetate, itaconic esters and mixtures of the foregoing monomers.

13. A maleic anhydride copolymer containing amine oxide groups according to claim 10 wherein the monomer is selected from the group consisting of styrene, alkylated styrene compounds, (meth)acrylic acid, (meth)acrylic esters, alkyl vinyl ethers, vinyl acetate, itaconic esters and mixtures of the foregoing monomers.

14. A maleic anhydride copolymer containing amine oxide groups according to claim 11 wherein the monomer is selected from the group consisting of styrene, alkylated styrene compounds, (meth)acrylic acid, (meth)acrylic esters, alkyl vinyl ethers, vinyl acetate, itaconic esters and mixtures of the foregoing monomers.

15. A maleic anhydride copolymer containing amine oxide groups as claimed in claim 1, wherein styrene is used as comonomer and the molar ratio of maleic anhydride to styrene is between about 1:1 and about 1:3.

16. A maleic anhydride copolymer containing amine oxide groups as claimed in claim 1, which has a weight-based molecular weight $M_w$ of from about 1000 to about 100,000 g/mol.

17. A maleic anhydride copolymer containing amine oxide groups as claimed in claim 1, wherein at least 1 mol % of the anhydride group are reacted diamine.

18. A maleic anhydride copolymer containing amine oxide groups as claimed in claim 17, which has a weight-based molecular weight $M_w$ of from 2,500 to 50,000.

19. A maleic anhydride copolymer containing amine oxide groups as claimed in claim 1, wherein carboxylic acid groups present in the polymer have been neutralized to carboxylate salts.

20. A pigment or filler which comprises a maleic anhydride copolymer containing amine oxide groups as claimed in claim 1.

21. A pigment concentrate which comprises a maleic anhydride copolymer containing amine oxided groups as claimed in claim 1, a solvent, optionally a binder, optionally a coating, and optionally an auxiliary.

22. A pigment concentrate according to claim 21, wherein the solvent is an organic solvent, water or a mixture thereof.

23. A coating concentrate which comprises a maleic anhydride copolymer containing amine oxide groups as claimed in claim 1, a binder, pigment, filler and optionally an auxiliary.

24. A method for dispersing a pigment or filler or a mixture thereof which comprises adding a maleic anhydride copolymer containing amine oxide groups according to claim 1 to said pigment or filler.

25. A method for preparing a pigment concentrate comprising pigments and/or fillers which comprise homogenizing the pigments and or fillers with a maleic anhydride copolymer containing amine oxide groups according to claim 1, optionally in the presence of a solvent, binder, coating or auxiliary.

26. A method according to claim 25, wherein the solvent is a organic solvent, water or a mixture thereof.

27. A dispersing additive which comprises a maleic anhydride according to claim 1.

* * * * *